Patented Nov. 3, 1953

2,658,055

UNITED STATES PATENT OFFICE 2,658,055

ORIENTABLE CONDENSATION POLYMERS OF HYDROXYPIVALIC ACID AND PROCESS FOR PREPARING THEM

Thomas Alderson, New Castle, Del., assignor to E. I. du Pont de Nemours and Company, Wilmington, Del., a corporation of Delaware No Drawing. Application August 24, 1951, Serial No. 243,603

11 Claims. (Cl. 260—78.3)

This invention relates to polymeric materials and, more particularly, to orientable condensation polymers of hydroxypivalic acid and to a process for preparing them.

The hitherto known polymers of hydroxypivalic acid have been only low molecular weight products which are not capable of being oriented by drawing and have not been suitable for use in the manufacture of fibers and films, or as plastics. For example, a polymer prepared by heating hydroxypivalic acid at about 200° C. for several hours contained only six recurring units, had a low melting point (165° C.), and was easily hydrolyzed. The use of higher reaction temperatures, e. g., 220–270° C., resulted in complete decomposition of the polymer to volatile products (Blaise and Marcilly, Bull. soc. chim. [3] 31. 308–17 (1904)). In view of the instability and low melting point of these polymers of the prior art it has been assumed that high molecular weight polymers of hydroxypivalic acid could not be made.

It is an object of this invention to provide polymers of hydroxypivalic acid which are suitable for the manufacture of fibers, filaments and films, and are orientable by drawing. Another object is to provide a process for producing such orientable polymers of hydroxypivalic acid. A further object is to provide oriented fibers and films of polymeric hydroxypivalic acid. Other objects of the invention will become apparent from the following description and the appended claims.

It has now been found that orientable polymers of hydroxypivalic acid suitable for the manufacture of fibers, filaments and films are produced by heating hydroxypivalic acid having a melting point of at least 122° C., or a corresponding hydroxypivalic acid ester of a low boiling aliphatic alcohol, at temperatures in the range of 150–200° C. until rapid evolution of the by-products resulting from condensation polymerization ceases, and then continuing the heating at temperatures in the range of 200–275° C. and at less than 1 mm. of mercury absolute pressure until a polymer having an intrinsic viscosity of at least 0.5 is obtained. While the use of a catalyst in the process of this invention is not essential, it is preferable to employ a small amount of an esterification catalyst to increase the rate of esterification and thus decrease the time required to prepare a polymer of the desired properties. It is also preferable to carry out the reaction in an inert atmosphere.

The polymers of this invention having an intrinsic viscosity greater than 0.5 are orientable, i. e., they are capable of being drawn into fibers showing by X-ray diffraction orientation along the fiber axis. These polymers having an intrinsic viscosity of at least 0.5 are high melting, e. g., they have melting points of 225–250° C.

The intrinsic viscosity referred to herein is expressed as the natural logarithm of the relative viscosity of a dilute solution of the polymer divided by the concentration of the polymer in the solution and extrapolated to zero concentration. In this calculation, the relative viscosity is the quotient of the viscometer flow time of the solution divided by the viscometer flow time of the solvent.

A preferred way of carrying out the process of this invention consists in heating pure hydroxypivalic acid having a melting point of at least 122° C., and preferably of 124–125° C., in an inert atmosphere, e. g., in the presence of nitrogen, at a temperature between 150° and 200° C. at atmospheric or moderately reduced pressures, e. g., between 760 and 300 mm. mercury pressure, until substantially all of the water formed as a byproduct of the polymerization is removed. The reaction is preferably carried out in the presence of 0.1 to 1% (based on the weight of hydroxypivalic acid) of an esterification catalyst, e. g., antimony oxide, phosphoric acid, or dibutyl tin dilaurate. This first stage of the reaction can be carried out at a single temperature and pressure within the above-defined range or it can be carried out in several steps at gradually increasing temperature and gradually decreasing pressure within this range. In the second stage of the reaction the polymer of the first step is heated to a temperature between 200° and 275° C. at a pressure less than 1 mm. of mercury until a polymer having the desired intrinsic viscosity is obtained. As in the first stage of this process, the second stage can be carried out at gradually increasing temperatures and gradually decreasing pressures within the limits defined above.

Especially good results are obtained by carrying out the second stage of the polymerization in such a way that the polymerization is stopped after heating for at least 10 hours and the polymer is cooled, the resulting solid product pulverized to a fine granular form which passes through a standard 20-mesh screen, and the powdered polymer is then reheated at 200–275° C., but below the melting point of the polymer, under a pressure of less than 1 mm. of mercury until a polymer of desired intrinsic viscosity is formed. It is desirable for the powder polymerization to be conducted at as high a temperature as possible, but below temperatures which cause the polymer to soften and coalesce, in order to minimize the time of this polymerization step. If the melt polymerization is conducted in the presence of a catalyst and includes a final heating at a temperature of at least 218° C. for at least 10 hours, the powder polymerization can be conducted at temperatures of 218-223° C. without exceeding the softening point of the polymer. When no catalyst is used it is preferable to conclude the melt polymerization by heating for at least 30 hours at a temperature of at least 218° C. By means of this powder polymerization modification an especially high degree of polymerization can be obtained.

While the process of this invention is particularly useful for producing homopolymers of hydroxypivalic acid, it is also useful for the preparation of copolymers of hydroxypivalic acid with other hydroxy acids, which term is intended to include cyclic esters thereof formed by self-esterification reactions. Copolymers of this type containing at least 90% of hydroxypivalic acid are included within the scope of this invention.

The hydroxypivalic acid used in the process of this invention must have a melting point of at least 122° C. in order to obtain polymers having intrinsic viscosities above 0.5. The melting point is determined by the usual method, particles of hydroxypivalic acid being placed in a capillary tube and observed as the temperature is slowly raised. Acid of melting point 124-125° C. gives the best polymers. Impure hydroxypivalic acid is not suitable. Very good results are obtained when the hydroxypivalic acid is finally purified by sublimation.

The invention is further illustrated by the following examples, in which the proportions of ingredients are expressed in parts by weight unless otherwise noted. The softening and melting points of polymers referred to are determined by placing a small amount of powdered polymer on a copper block, slowly raising the temperature of the block, and observing the temperature at which the polymer first begins to soften and the temperature at which the polymer liquefies. A more accurate determination of the melting point, referred to in Example 5 as the X-ray melting point, is obtained by taking X-ray photographs of the crystalline structure at temperature increments of 1° C. and noting the lowest temperature at which the crystalline structure disappears.

*Example 1*

A reaction vessel designed to permit distillation at reduced and at atmospheric pressure is charged with 5 parts of pure hydroxypivalic acid (melting point 124-125° C.), 0.05 part of 85% phosphoric acid, and 0.025 part of triphenyl phosphite. The reactants are heated at 155° C. at atmospheric pressure for 75 hours, at 218° C. and 0.7 mm. pressure for 17 hours, at 255° C. and 0.1 mm. pressure for 74.75 hours, and at 275° C. and 0.1 mm. pressure for 26 hours. The resulting polymer is a hard, tough, polymer which softens at 220° C., starts to melt at 233° C. and is completely liquid at 248° C. This polymer has an intrinsic viscosity of 0.8, determined in a mixture of 10 parts of phenol and 7 parts of trichlorophenol at 25° C. The polymer can be manually melt-spun into long fibers.

*Example 2*

A reaction vessel of the type used in Example 1 is charged with 15 parts of hydroxypivalic acid having a melting point of 122-123° C., 0.002 part of dibutyl tin dilaurate, and 0.002 part of triphenyl phosphite. A stream of nitrogen is passed through the reactor and the reactants are heated at 155° C. for 18 hours at atmospheric pressure, at 197° C. and atmospheric pressure for 4.5 hours, at 197° C. and 20 mm. pressure for 26 hours, and at 218° C. and 1-2 mm. pressure for 24 hours. The polymer obtained in this stage has a melting point of 240° C. On further heating at 255° C. and 0.5 mm. pressure for 23 hours there is obtained 8.8 parts of a polymer which is capable of being manually melt-spun into fibers.

*Example 3*

An apparatus designed to permit distillation at atmospheric and reduced pressures is charged with 19 parts of sublimed hydroxypivalic acid, melting point 124.5-125° C. A stream of nitrogen is passed through this hydroxypivalic acid and the reaction vessel is heated for 17 hours at 155° C. and atmospheric pressure, 4.5 hours at 155° C. and 300 mm. pressure, 1.5 hours at 155° C. and 95 mm. pressure, 1 hour at 197° C. and 95 mm. pressure, 18 hours at 197° C. and 30 mm. pressure and 30 hours at 197° C. and 2 mm. pressure. At the completion of this heating cycle there is obtained 14,270 parts of a hard, white polymer which softens at 192° C. and melts at 215-220° C. A portion of this solid, 10.230 parts, is then heated at 230° C. for 30 hours at 0.1 mm. pressure to yield 9.049 parts of a white, hard polymer of hydroxypivalic acid, which melts at 225-234° C., has an intrinsic viscosity of 0.43, determined in a mixture of 10 parts of phenol and 7 parts of trichlorophenol at 25° C., and can be melt-spun to long fibers. A portion of this solid is ground fine enough to pass through a standard 20-mesh screen, and 3.05 parts of the powder is heated 45.5 hours at 218° C. (below the softening point of the polymer) and 0.1 mm. pressure to yield 2.895 parts of white powder, melting point 232-245° C., and having an intrinsic viscosity of 0.59, determined in phenol-trichlorophenol (10-7) mixture. The product from this powder polymerization is melt-spun to long, flexible fibers.

*Example 4*

A reaction vessel of the type used in the preceding examples is charged with 20 parts of pure hydroxypivalic acid and 0.02 part of antimony trioxide and the reaction mixture is blanketed with nitrogen. The reactants are heated at 197° C. for 16 hours at atmospheric pressure and for 8 hours at a maximum pressure of 0.5 mm., and at 223° C. and 0.5 mm. pressure for 16 hours. The resulting polymer is cooled and the solid is pulverized to pass a 20-mesh standard screen. The powder is then heated at 218° C. for 5 hours at 0.5 mm. pressure, and at 223° C. and 0.5 mm. pressure for 55 hours. At the end of this time a polymer of hydroxypivalic acid having an intrinsic viscosity of 0.74, measured in phenol-trichlorophenol (10-7) mixture, is obtained. This polymer is melt-spun in a press spinner at a temperature of 230-235° C. under a pressure of 4000 lb./sq. in. The fiber as it emerges from the spinneret is quenched in a kerosene bath maintained at 15° C. and located within 15 cm. of the spinneret face. This fiber is then drawn manually to four times its original length. X-ray diffraction patterns obtained from the undrawn fiber show no orientation; whereas X-ray diffraction patterns of the drawn fiber have an orientation angle of about 17°, which corresponds

Example 5

A reaction vessel of the type used in the preceding examples is charged with 20 parts of hydroxypivalic acid having a melting point of 123° C. and 0.02 part of antimony trioxide and the reaction mixture is blanketed with nitrogen. The reactants are heated to 197° C. at atmospheric pressure. As the distillation of the byproduct water slows down, the pressure is reduced gradually over a period of 6 hours to about 0.5 mm. The molten reaction mass is agitated throughout the polymerization by means of a stream of nitrogen. The reaction mass is maintained at 197° C. and about 0.5 mm. pressure for 16 hours, and then the temperature is raised to 223° C. for an additional 12 hours. Next the melt is cooled to obtain a solid white polymer, which is pulverized to pass a standard 20-mesh screen. The powder is heated at 223° C. and 0.5 mm. pressure for 12 hours. The resulting polymer has a light tan color and an intrinsic viscosity of 0.90, measured in phenol-trichlorophenol (10-7) mixture. The polymer has an X-ray melting point of 235° C. and a density of 1.20 at 24.5° C.

The examples have illustrated this invention by reference to several polymers of hydroxypivalic acid. However, copolymers with other hydroxy acids or cyclic esters thereof formed by self-esterification reactions, containing at least 90% of hydroxypivalic acid, can be made by the process of this invention. Specific examples of copolymers which can be prepared include copolymers of hydroxypivalic acid containing up to 10% of lactic acid, hydracrylic acid, glycolide, p-hydroxyethoxybenzoic acid, p-hydroxymethylbenzoic acid, or salicylic acid.

In addition to the specific catalysts mentioned in the examples, other esterification catalysts can be used in the process of this invention. Examples of additional catalysts include antimony trifluoride, p-toluenesulfonic acid, and polyphosphoric acid. The catalysts can be used in amounts ranging from 0.05% to 5% of the weight of the polyhydroxypivalic acid. However, amounts ranging from 0.1 to 1% are preferred since they give especially good results.

The polymers of this invention can also be prepared by heating a hydroxypivalic acid ester of a low boiling aliphatic alcohol in the process described above. In such case the lower aliphatic alcohol is released as a by-product and removed during the distillation in the same way that water is removed during the heating of hydroxypivalic acid itself. It is only necessary that the hydroxypivalic acid ester be one in which the aliphatic alcohol released boils below the reaction temperature, e. g., below 150° C. Examples of hydroxypivalic acid esters which can be used include methyl, n-butyl, and isobutyl hydroxypivalate. The polymers prepared from the esters of hydroxypivalic acid are generally of lower molecular weight than those prepared from the free acid.

In some instances it is desirable to include in the polymerization system a stabilizer such as triphenyl phosphite. This is not essential for operability of the process of this invention, but may be useful to prevent discoloration of the polymer, which occurs under some conditions.

The hydroxypivalic acid polymers of this invention are particularly useful for the manufacture of fibers, filaments, and self-supporting films, in view of their ability to be oriented by cold drawing. The polymers of this invention are also useful in those applications which require high resistance to hydrolysis. Orientable polymers of hydroxypivalic acid are exceedingly resistant to hydrolysis, being much superior in this respect to hitherto known aliphatic polyesters.

For example, treatment of polymeric hydroxypivalic acid with water at 100° C. for 16 hours results in only 0.045 mole per cent hydrolysis of the polymer. Likewise, a sample of hydroxypivalic acid polymer heated at 100° C. in 0.1 normal sodium hydroxide for 5.75 hours results in only 4.8 mole per cent saponification of the polymer. In contrast to this, a polyester prepared from succinic acid and ethylene glycol as disclosed in U. S. Patent No. 2,071,250 to Carothers, having a melting point of 165-170° C. and capable of being melt-spun into orientable fibers, is hydrolyzed to the extent of 1.5 mole per cent by exposure to water at 100° C. for 16 hours; it is saponified to the extent of 58.5 mole per cent when heated at 100° C. for 4.75 hours in 0.1 normal sodium hydroxide. Under the same conditions, a comparable polymer of hydroxyacetic acid is hydrolized to the extent of 40 mole per cent by water at 100° C. and saponified to the extent of 93.8 mole per cent by 0.1 normal sodium hydroxide at 100° C.

As many different embodiments of the present invention may be made without departing from the spirit and scope thereof, it is to be understood that the invention is not limited to the specific embodiments disclosed except to the extent defined in the appended claims.

What is claimed is:

1. A process for producing orientable polymers of hydroxypivalic acid which comprises heating a member of the group consisting of hydroxypivalic acid having a melting point of at least 122° C. and corresponding hydroxypivalic acid esters of low boiling aliphatic alcohols at temperatures in the range of 150-200° C. until rapid evolution of by-products ceases, and then continuing the heating at temperatures in the range of 200-275° C. and at less than 1 mm. of mercury absolute pressure until a polymer having an intrinsic viscosity of at least 0.5 is formed.

2. A process for producing orientable polymers of hydroxypivalic acid which comprises heating hydroxypivalic acid having a melting point of at least 122° C. in an inert atmosphere at temperatures in the range of 150-200° C. and at pressures between 760 and 300 mm. of mercury until substantially all of the water formed as a by-product of the polymerization is removed, and then continuing the heating at temperatures in the range of 200-275° C. and at least than 1 mm. of mercury absolute pressure until a polymer having an intrinsic viscosity of at least 0.5 is formed.

3. A process as defined in claim 2 in which said hydroxypivalic acid has a melting point of 124-125° C.

4. A process as defined in claim 2 in which said hydroxypivalic acid is heated at gradually increasing temperatures within the specified temperature ranges.

5. A process for producing orientable polymers of hydroxypivalic acid which comprises heating hydroxypivalic acid having a melting point of at least 122° C. in the presence of 0.1 to 1% of an esterification catalyst based on the weight of hydroxypivalic acid at temperatures in the range of 150-200° C. and at pressures between 760 and 300 mm. of mercury until substantially all of the water formed as a by-product of the polymerization is removed, and then continuing the heating at temperatures in the range of 200–275° C. and at less than 1 mm. of mercury absolute pressure until a polymer having an intrinsic viscosity of at least 0.5 is formed.

6. A process for producing orientable polymers of hydroxypivalic acid which comprises heating hydroxypivalic acid having a melting point of at least 122° C. at temperatures in the range of 150–200° C. until rapid evolution of water ceases, continuing the heating at temperatures in the range of 200–275° C. and at less than 1 mm. of mercury absolute pressure for at least 10 hours, cooling the resulting polymer, pulverizing the polymer, and heating the powdered polymer at temperatures in the range of 200–275° C. below the melting point of the polymer and at less than 1 mm. of mercury absolute pressure until a polymer having an intrinsic viscosity of at least 0.5 is formed.

7. Polymerized hydroxypivalic acid having an intrinsic viscosity of at least 0.5.

8. A polymer of hydroxypivalic acid having a melting point of 225° to 250° C.

9. A polymer of hydroxy acid containing at least 90% of hydroxypivalic acid and up to 10% of another hydroxy acid, said polymer having an intrinsic viscosity of at least 0.5.

10. Orientable fibers of polymerized hydroxypivalic acid.

11. Drawn fibers of polymerized hydroxypivalic acid having a high degree of orientation along the fiber axis.

THOMAS ALDERSON.

References Cited in the file of this patent

UNITED STATES PATENTS

| Number | Name | Date |
|---|---|---|
| 1,095,205 | Gruter | May 5, 1915 |

FOREIGN PATENTS

| Number | Country | Date |
|---|---|---|
| 550,837 | Great Britain | Jan. 27, 1943 |

OTHER REFERENCES

Bull. Soc. Chim., 3rd Series 31, 308–17 (1904).